United States Patent
Sitaraman et al.

(10) Patent No.: US 6,301,618 B1
(45) Date of Patent: *Oct. 9, 2001

(54) FORCED SEQUENTIAL ACCESS TO SPECIFIED DOMAINS IN A COMPUTER NETWORK (75) Inventors: Aravind Sitaraman, Santa Clara; Shuxian Lou, San Jose; Shujin Zhang, San Mateo, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/659,217

(22) Filed: Sep. 11, 2000

Related U.S. Application Data (63) Continuation of application No. 09/169,315, filed on Oct. 8, 1998, now Pat. No. 6,212,561.
(51) Int. Cl.[7] ....................................................... G06F 13/00
(52) U.S. Cl. ........................ 709/227; 709/219; 709/223; 709/225
(58) Field of Search .................................... 709/217, 219, 709/223, 224, 225, 227, 238, 313; 713/201

(56) References Cited

U.S. PATENT DOCUMENTS

| | | | |
|---|---|---|---|
| 5,655,077 | 8/1997 | Jones et al. | 395/187.01 |
| 5,684,950 | 11/1997 | Dare et al. | 395/187.01 |
| 5,944,824 | 8/1999 | He | 713/201 |
| 6,092,196 | 7/2000 | Reiche | 713/200 |
| 6,141,687 | 10/2000 | Blair | 709/225 |

*Primary Examiner*—Viet D. Vu
(74) *Attorney, Agent, or Firm*—Thelen Reid & Priest LLP; David B. Ritchie (57) ABSTRACT The present invention is a method and apparatus for providing the owners of domain sites on a computer network or the owners of private remotely accessible intra networks the capability to force authorized users to disconnect from any open connections to other public or private domains or networks before a connection with the owners domain or network can be established. This forced sequential access of a specified domain or network is accomplished by inserting a sequential-only attribute into the service profile for a specified user. Upon the user initiating a log-on sequence through an access point, the user's service profile is pulled from a memory bank and an assessment is made as to whether or not the sequential-only attribute exists for the desired specified domain or network to be accessed. If the attribute exists and the user has potentially concurrent connections outstanding, the user is alerted of the mandatory requirement to disconnect from these open connections before proceeding further with desired specified domain or network connection.

30 Claims, 4 Drawing Sheets

FORCED SEQUENTIAL ACCESS TO SPECIFIED DOMAINS IN A COMPUTER NETWORK

This application is a continuation of Ser. No. 09/169,315 Oct. 8, 1998 now U.S. Pat. 6,212,561.

BACKGROUND OF THE INVENTION

1. Field of the Invention

The present invention relates to securing user domain access in a computer network. More particularly, the present invention relates to forcing a network computer user to terminate all then existing domain connections before proceeding with a connection to a secured domain requiring sequential only access.

2. The Background

A significant concern of the individual private and public domains making up the Internet or any other system incorporating multiple networks is the ability to insure that only those users who are authorized to access the individual private and public domains within the comprehensive network have the capability to access such networks. Serious security risks are posed by the possibility of unauthorized users having the know-how and capability to invade the individual private and public domains within the network.

In today's networking environment, many privately owned domain sites exist on the Internet which allow access only to those individuals which have been granted the proper authorization. For example, these may include company owned private domains containing confidential information and, as such, the company may grant access only to those employed by the company, or they may be communities of interest (i.e. "pay-sites") which provide information only to those users which subscribe to the privately owned domain. The user who connects to the Internet, typically by means of an Internet Service Provider (ISP) or Telephone Company (Telco), may also possess the capability to make numerous concurrent connections to these privately owned and "secure" domain sites. While these simultaneous connections add to user efficiency, they do so at the cost of heightening the potential for security violations.

Additionally, it is becoming increasingly more prevalent for individual computer users to have the capability to remotely access privately owned intra networks. This type of access allows the user to connect with the private intra network of the company from the user's residence by means of the telephone line or other convenient means. The inception of wireless remote connections have even made it possible for users to connect from almost any imaginable locale. The ability to connect remotely to individual private intra networks, once seen as a luxury, has become so commonplace that many working professionals require such access in order to accomplish their everyday job assignments. In many instances, remote users connect to privately owned intra networks through the same means that individuals connect to the Internet, typically Telcos or ISPs. This allows the remote user to concurrently connect with any number of authorized private intra networks, as well as the various public and private domains of the Internet. While these simultaneous connections are efficient to the user, they also pose the potential for serious security violations.

Figure 1:
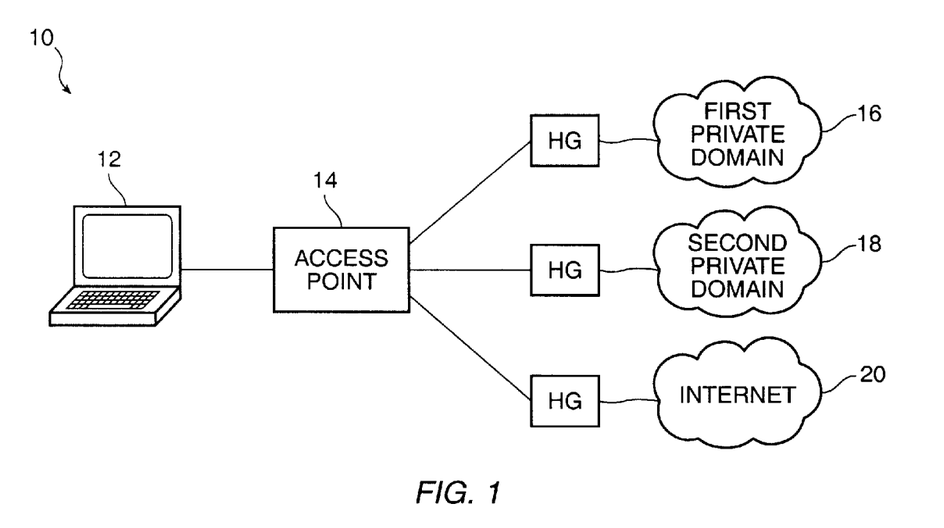
FIG. 1 is a schematic drawing of a computer network wherein the host computer has multiple simultaneous access to three domains within the network.

FIG. 1 shows a simplified diagram of a computer user connected to a computer network 10 via a host computer 12 linked to an access point 14 which grants authorization to external networks or domains 16, 18 and 20. The potential for a network security violation is posed by the user having the required authorization and capability through the access point 14 to connect with the various domains 16, 18 and 20 simultaneously. The user has access to the computer networks through a work station or host computer 12. The host computer 12 has the capability to connect with the external networks through an access point 14. An access point 14 is essentially an external location capable of permitting authorized users to access external computer networks, typically the access point consists of a series of Network Access Servers (NASs) and other related hardware, software and/or firmware. An access point 1 4 may also include a modem pool (not shown) maintained by a Telephone Company (Telco) or an Internet Service Provider (ISP) which enables its authorized users or subscribers to obtain external network access through the host computer 12 which has the required dial-up connection capability. Those of ordinary skill in the art will recognize that other types of access methods may be provided by a Telcos or ISP such as frame relay, leased lines, ATM (Asynchronous Transfer Mode), ADSL (Asymmetric Digital Subscriber Line) and the like.

Typically, when the user desires to access a specified domain, such as the first privately owned secured domain site 16 the user runs a network logon application program on the host computer 12 which requires the user to input user identification and authorization information as a means of initiating access to the desired network. This information is then directed to the access point 14 where it is verified to insure that the host user has the required authorization to permit access to the desired network. Once authorization is granted to the user a connection is established via the access point 14 with the home gate 22 of the specified first privately owned secure domain site 16. The connection established may be a tunnel-based connections, such as L2TP (Layer Two Tunneling Protocol) or L2F (Layer Two Forwarding) or an IP-based (Internet Protocol) connection, such as used with ATM or frame relay. The user of the host computer 12, having established such a connection, has the ongoing capability to access the specified domain until the connection is terminated either at the directive of the user or by error in data transmission. The access point 14 will typically have the capability to connect the user to various other privately owned secured domain sites, such as the second private domain site 18 or the public Internet 20. This key function of the access point 14 allows the host computer 12 to access other privately owned secured domain sites, private intra networks or the public domains of the Internet concurrently while the initial connection to the first specified private domain site 16 connection remains open. However, while simultaneous dual usage of specified domains can be a useful advantage in terms of data transfer and efficiency, it can also open up unlimited possibilities for potential security violations.

Figure 2:
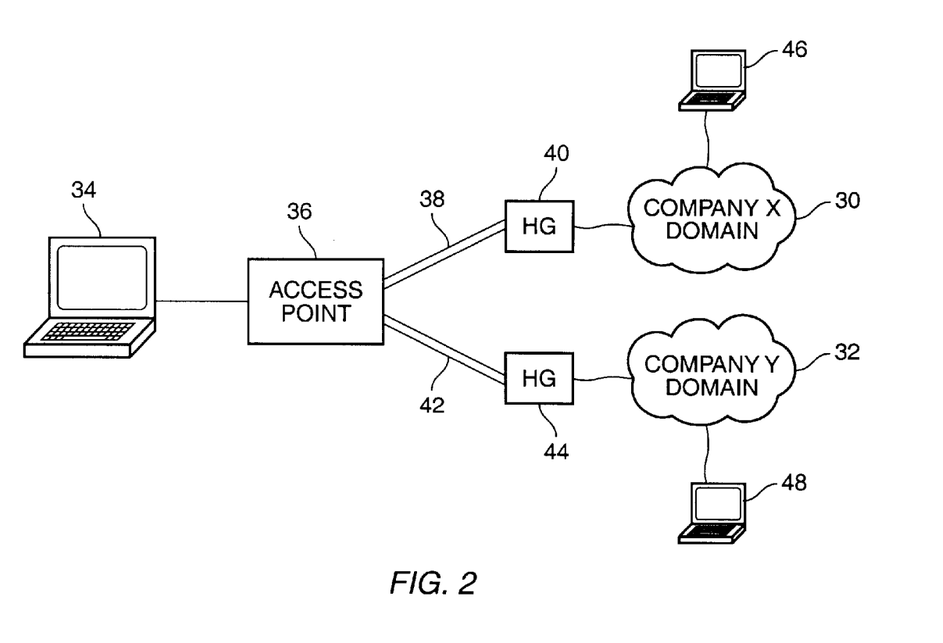
FIG. 2 is a schematic drawing of a computer network illustrating the security risk posed by the host computer having the capability to access private domain sites concurrently.

For example, FIG. 2 illustrates the scenario which may present itself where the computer user is a consultant employed by two competing companies; company X the owner of a first privately owned secured domain site 30 and company Y the owner of a second privately owned secured domain site 32. The consultant, as a means of carrying out his services, has been granted authorized remote access to both privately owned secured domain sites 30, 32. The consultant/user's host computer 34 remotely connects to these two privately owned secured domain sites 30, 32 through an access point 36, typically an ISP or Telco. The consultant/user thereby has the capability to access the two privately owned secured domain sites concurrently. The consultant/user first initiates a log-on session through an application program to gain authorized access to Company X's privately owned secured domain site 30. The authorization data, typically a user name and password, is then transmitted to the access point 36 where it is verified for authorization. Once authorization has taken place, an L2TP tunnel 38 is created between the access point 36 and the home gate 40 of Company X's privately owned secured domain site 30. While the tunnel connection to Company X's privately owned secured domain site 30 remains open, the consultant/user may have the desire to open a connection to Company Y's privately owned secured domain site 32. This connection is initiated in the same fashion as the first connection, an application program allows for log-on, authorization data is transmitted and verified at the access point 36 and an L2TP tunnel 42 connection is created between the access point 36 and the home gate 44 of Company Y's privately owned secured domain site 32.

It is in the instance, where the consultant/user has connections open concurrently with both the Company X's privately owned secured domain site 30 and Company Y's privately owned secured domain site 32 that the potential exists for an internal user of either the Company X's or Company Y's privately owned secured domain site to gain unauthorized access to the competitor's privately owned secured site. For example, an authorized user/host 46 of Company X's privately owned secured domain site 30 who has knowledge of the telnet protocol would be able to readily access the remote host computer 34 of the consultant/user. Once the remote host computer 34 of the consultant/user is accessed, then the authorized user/host 46 of Company X's privately owned secured domain site would be able to gain unauthorized access to Company Y's privately owned secured domain site 32 through the then-existing L2TP tunnel 38 created by the consultant/user if the unauthorized user possessed limited knowledge related to the consultant/user's host computer 34 and the IP (internet protocol) address of the consultant/user. With this same methodology, the opposite scenario presents itself, an authorized user/host 48 of Company Y's privately owned secured domain site 32 can potentially gain unauthorized access to Company Z's privately owned secured domain site. This type of security risk is unquestionably present today and poses a serious threat to the confidential information that businesses maintain on both privately owned and secured domain sites and private intra networks which are remotely accessible.

Additionally, a security risk is posed by the user/host who has multiple connections to various networks/domains and one of the then-existing open connections is maintained with the public Internet. In this scenario, all the simultaneous users of the Internet present themselves as possible security risks. Any one of the millions of then connected Internet users who possess the minimum remote user/host data; typically, the telnet protocol, the user/host hardware specifications and the user/host IP address, would have the potential to pierce the L2TP or L2F tunnel connection created by the authorized user and gain unauthorized access to the privately owned secured domain site.

Furthermore, the IP forwarding capabilities of certain operating systems, such as Windows NT, a product of Microsoft Corporation of Redmond, Wash. allow the redirection of IP packets among various TCP/IP connections without desired levels of security. While these types of operating systems are beneficial for their desired IP forwarding attributes, they fail to offer the owner of private domain sites the security necessary to insure that the confidential information found on their domain site is limited to authorized users.

The currently available solutions to this problem are very limited and do not offer the level of security protection that most companies operating secured and confidential private intra networks demand. Typically, in today's networking environment most companies operating privately owned secured domain sites or private remotely accessible intra networks are limited to operator/user dependant verbal or written instructions as to how to avoid the potential for security violations. This effectively means that owners of such domains or networks can do little more than warn the remote users of the security risk posed by multiple access and instruct the users not to access their particular domain or network while other connections remain open. This type of user-dependant security measure has, understandably, met with little success and the security risks which remain are pervasive and potentially devastating.

In other instances, companies have been able to minimize the risk by setting up internal access points which effectively cause the user/host to dial-in or connect directly with the private intra network without going through an external ISP or Telco. While this direct-connect service allows some measure of security it does so at the expense of increasing the costs associated with maintaining an internal access point and the additional connection costs related to remote users having to potentially incur long distance telephone service charges. Additionally, even direct connect service is not without security risks. In today's networking environment it is not uncommon for the host/user to have the capability for dual line external connections, posing the possibility of a user being connected through a first line to the direct connect private intra network while concurrently being connected via the second line to the Internet through an ISP or Telco access point. In this instance, the same security risks as described above are apparent and, thus, the direct-connect service provides inadequate security precautions for this instance, as well.

BRIEF DESCRIPTION OF THE INVENTION

The present invention is a method and apparatus for providing the owners of domain sites on a computer network or the owners of private remotely accessible intra networks the capability to force authorized users to disconnect from any open connections to other public or private domains or networks before a connection with the owners' domain or network can be established. This forced sequential access of a specified domain or network is accomplished by inserting a sequential-only attribute into the service profile for a specified user. Upon the user initiating a log-on sequence through an access point, the user's service profile is pulled from a memory bank and an assessment is made as to whether or not the sequential-only attribute exists for the desired specified domain or network to be accessed. If the attribute exists and the user has potentially concurrent connections outstanding, the user is alerted of the mandatory requirement to disconnect from these open connections before proceeding further with desired specified domain or network connection.

OBJECTS AND ADVANTAGES OF THE INVENTION

Accordingly, it is an object and advantage of the present invention to provide a method for the owners of private secured domain sites or private remotely accessible intra networks to force authorized users to disconnect from any open connections to other public or private domains before a connection with the owners' domain or network can be established.

Another object and advantage of the present invention is to provide for a computer network system which allows the owners of private secured domain sites or private remote accessible intra networks to force authorized users to disconnect from any open connections to other public or private domains before a connection with the owner's domain or network can be established.

Another object and advantage of the present invention is to provide the owners of private secured domain sites or private remotely accessible intra networks a means to prevent unauthorized access to the secured domain site or private intra network.

Another object and advantage of the present invention is to force the users in a multiple access computer network environment to disconnect from currently open connections to private or public domains before proceeding with the opening of an additional connection to a secured domain.

Yet another object and advantage of the present invention is to allow the owner/operator of the privately secured domain site or private remotely accessible intra network to choose which authorized users will be subjected to mandatory forced sequential access and which authorized users will be allowed to maintain multiple access capability.

These and many other objects and advantages of the present invention will become apparent to those of ordinary skill in the art from a consideration of the drawings and ensuing description.

DETAILED DESCRIPTION OF THE PRESENT INVENTION

Those of ordinary skill in the art will realize that the following description of the present invention is illustrative only and is not intended to be in any way limiting. Other embodiments of the invention will readily suggest themselves to such skilled persons from an examination of the within disclosure.

Figure 3:
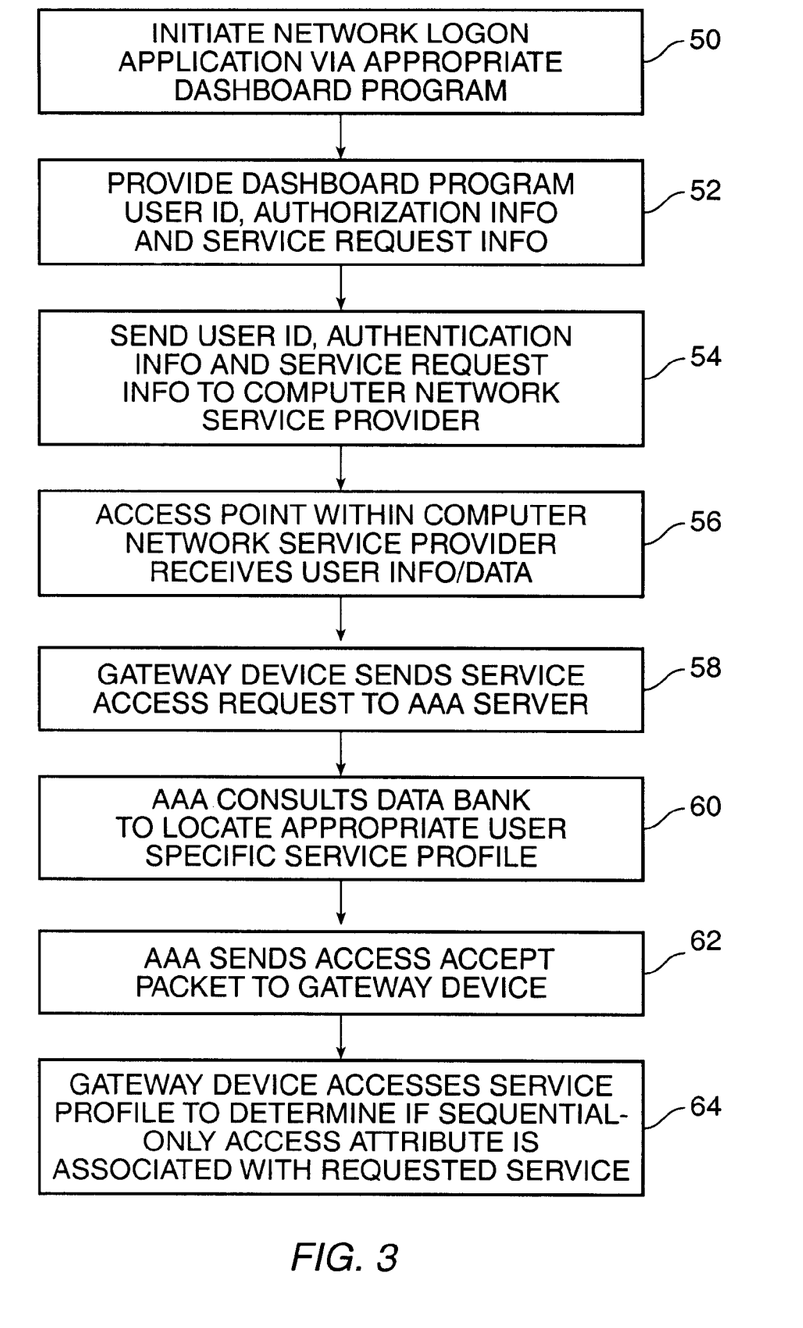
FIG. 3 is a flow diagram of a method for providing forced sequential access to a user in a differentiated computer network in accordance with a presently preferred embodiment of the present invention.

In a presently preferred embodiment of the present invention, a method for providing forced sequential access to a host/user in a computer network capable of establishing multiple concurrent access is detailed in the flow diagram of FIG. 3. Initially, at step 50, the user initiates a network logon application by launching an appropriate dashboard program located on the host computer. At step 52, such an application program will typically require the user to enter some form of user identification, authentication data and network service name, most generally, a user-name, a private password and the service identifier. It may be possible for the host computer to store such information in memory and provide this information to the application program automatically upon initiating the program. The application program then contacts a computer network service provider, typically a telephone company (Telco) or commercial internet service provider (ISP), via a modem and telephone line and, at step 54, sends the computer network service provider with the user identification and authentication information.

The identification, authentication and service information is then received at the computer network service provider operated access point, step 56. Typically, this will involve the data being received by a gateway device, such as the Service Selection Gateway (SSG) model 6510 manufactured by Cisco Technology, Inc. of San Jose, Calif., which authenticates the identity of the user in order to provide the user with access. If the overall network is differentiated into public areas, which are accessible to all user/subscribers, and private areas that are accessible only to authorized users, then the identity of the user is of particular importance. The gateway device will typically communicate with a server to assess the service profile of a user whose identity has been authenticated. This server is readily referred to by those of ordinary skill in the art as an Authentication, Authorization and Accounting (AAA) server. The AAA server may accommodate several client gateway devices simultaneously and communication between the AAA server and the gateway devices is in accordance with a standard Internet protocol, such as the Remote Authentication Dial-In User Service (RADIUS) protocol. At step 58, the gateway device sends an "access request" packet to the AAA server which contains the service name information entered by the user, as well as additional information identifying the specific gateway device client.

The AAA server contains a large data bank of stored service profiles, each service profile connected with an individual user/subscriber. The service profiles contain information such as, but not limited to, user-names, encrypted passwords, configuration information detailing the type of service that is to be provided to the user and home gateway information connected with user authorized private network domains. At step 60, when the AAA server receives an access-request packet from an authorized SSG client, it consults the data bank of service profiles and makes a match based on the user information provided in the request. In order to access the individual profile a match must be made between the password entered by the user and the password tied to the service profile. If the passwords match, and all other requirements are met, then at step 62, the AAA server sends the SSG an "access-accept" packet in response. The access-accept packet contains the necessary configuration data that enables the SSG to provide the desired service to the user. At step 64, the gateway device assesses the data within the service profile to determine whether or not a sequential only attribute exists within the service profile for the particular private domain site which the user has requested access to.

Figure 4:
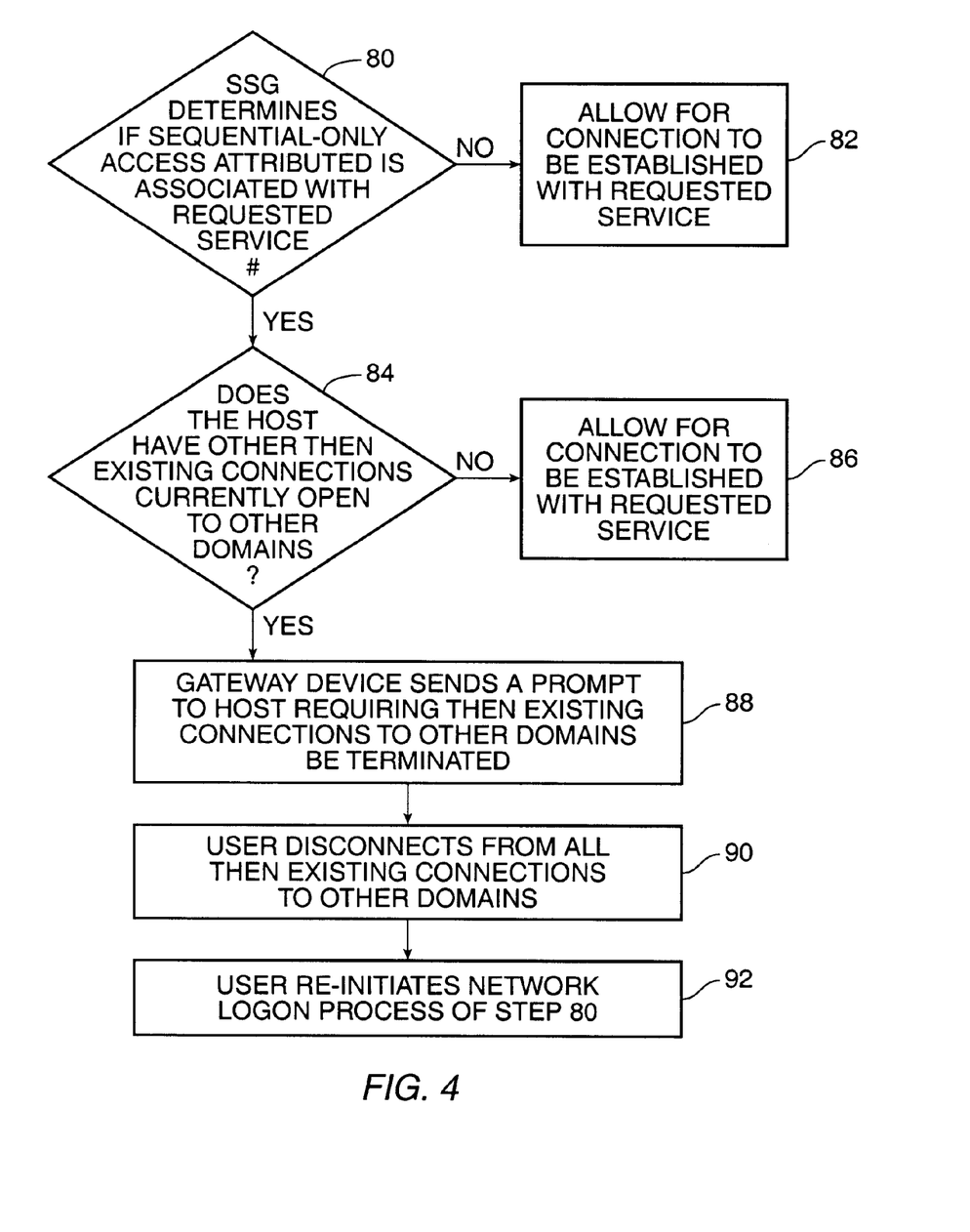
FIG. 4 is a flow diagram of the service provider's determination as to whether a sequential only attribute exists within a service profile for a desired private domain site and the subsequent steps used to institute forced sequential access in accordance with a presently preferred embodiment of the present invention.

Electively included within the service profile may or may not be a sequential-only network access attribute which is tied to a specific private network domain that the user/subscriber has authorization to access. The sequential-only network access attribute is provided in the user profile at the request of the owner of the private domain network and provides the owner of the private domain network with an added domain security device. FIG. 4 shows a detailed flow of the access point's determination of whether or not a sequential only attribute exists and the actions which ensue. At step 80, the gateway device determines if the sequential-only network access attribute is tied to the requested and authorized private network domain within a service profile. At step 82, if the sequential-only network access attribute does not exist for a user authorized private domain network then a connection is established with the home gate of the requested private domain. If, however, the sequential-only network access attribute is present in the service profile and is associated with the requested private domain network then the SSG makes a first initial assessment, at step 84, as to whether or not the host computer has any then-existing open connections to any other public or private domain networks. If no other then-existing connections exist then, at step 86, the sequential-only network access attribute is ignored and a connection is established with the home gate of the requested private domain. At step 88, if a determination is made that the host user does have then-existing connections open with any other public or private domain networks, then a prompt is sent from the SSG to the host user which informs the user that then-existing connections are currently open and that the user must close these connections before proceeding with a connection to the desired private domain network. The host user will not be granted access to the requested private domain network until all then existing connections are disabled at step 90. Once all then existing connections are disabled then the user can re-initiate the desired network logon process at step 92.

The SSG and AAA communicate with one-another according to the Remote Access Dial-In User Service (RADIUS) protocol. The specific details of the RADIUS protocol are well-known by those of ordinary skill in the art. Moreover, as will be apparent to those of ordinary skill in the art, the specific details of the RADIUS protocol have limited applicability to the present invention and, therefore a detailed discussion of this protocol is deemed unnecessary. The preferred methods of the present invention described herein are not limited to the use of the RADIUS protocol and other equivalent authentication protocols may be used. The RADIUS syntax of the sequential-only attribute implemented in accordance with a presently preferred embodiment of the present invention reads as follows:

code: 251, 'M' len: 4

```
+-+-+-+-+-+-+-+-+-+-+
|a|b|   c   |d|e|f|g|
+-+-+-+-+-+-+-+-+-+-+
``` where:

a=26 (RADIUS attribute for vendor specific)

b=len (length of the RADIUS vendor specific attribute)

c=9 (SSG vendor ID)

d=251 (Sub attribute ID for Service-Info)

e=len (length of the vendor specific sub attribute)

f='M' (service-info code for service mode)

g='S'/'C' (sequential or concurrent)

Figure 5:
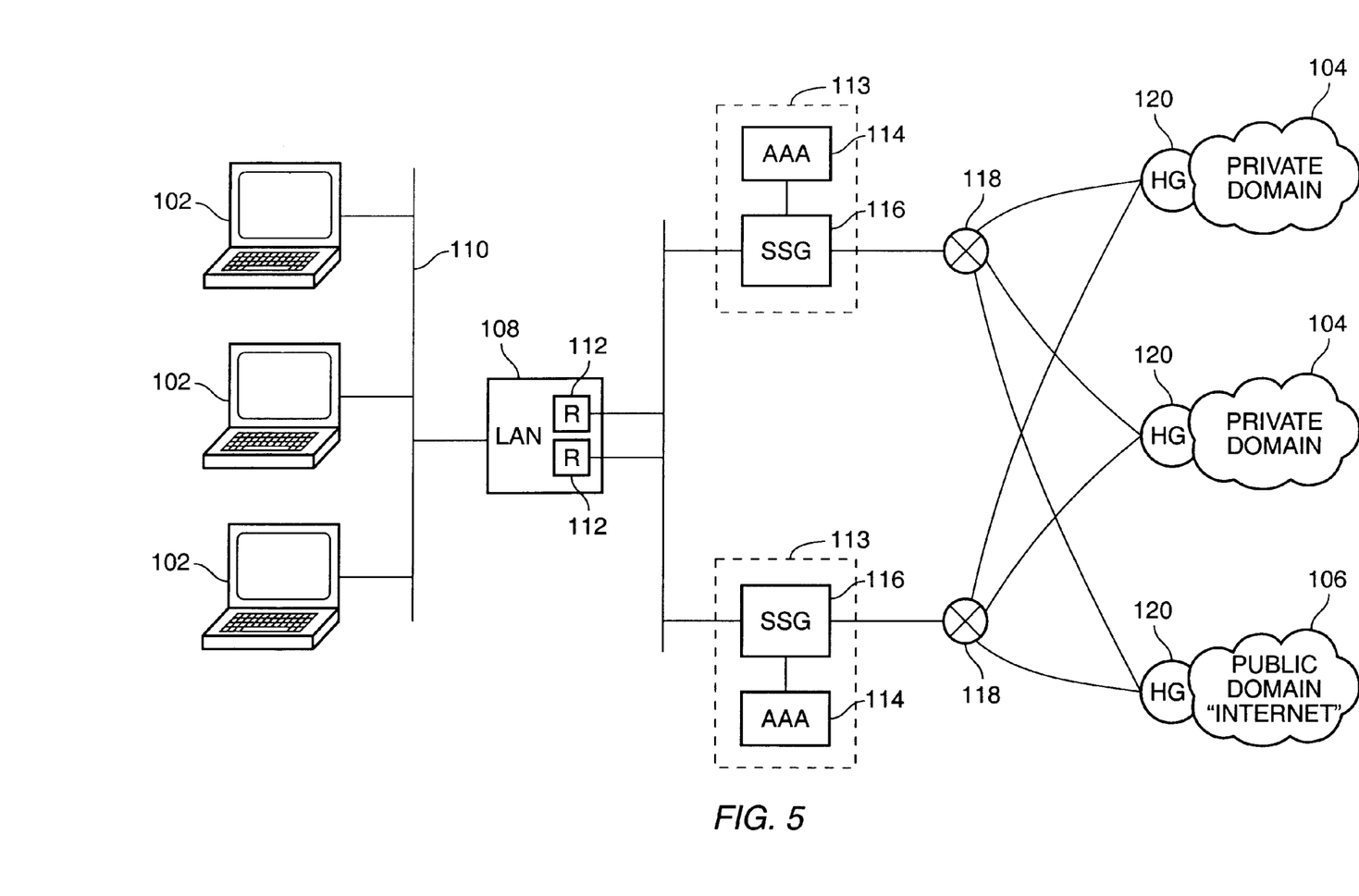
FIG. 5 is a schematic diagram of a differentiated computer network which has the capability to employ forced sequential access in accordance with a presently preferred embodiment of the present invention.

In another presently preferred embodiment of the invention, illustrated in FIG. 5a simplified communication system 100 is shown whereby users connect to a specified public or private domain networks within communication system 100 through host computers 102. The host computers 102 have the capability to connect or link with private domains 104, public domains 106, such as the Internet or private intra networks (not shown in FIG. 5). These links or connections are established via a series of hardware which serve to grant access to specific domains and transport data packets to and from the host computers 102 and domains 104, 106.

The host computers 102 in this particular computer network are connected to a local area network (LAN) 108 via a transmission means 110, such as copper wire or cable. Broadcast mechanisms such as Ethernet™ may be used as a bus-based broadcast network with decentralized control and operating at about 10 to about 100 megabits/second (Mbps). Those of ordinary skill in the art will recognize that other types of broadcast mechanisms may be provided by an ISP or Telco such as frame relay, leased lines, ATM (Asynchronous Transfer Mode), ADSL (Asymmetric Digital Subscriber Line) or the like. The LAN 108 serves to connect the host computers in a local environment and serves as a centralized location for routing information data packets to and from larger networks in the overall system. In turn, the routers 112 of the LAN 108 are linked to access points 113. Typically, the access points are located within a wide area network (WAN) (not shown in FIG. 5) and are operated by Telcos or ISPs. The access points 113 house AAA servers, Service Selection Gateways and Network Access Servers (NASs), Digital Subscriber Line Aggregation Multiplexers (DSLAMs) or similar devices. The NASs, DSLAMs or similar devices, which are not depicted in FIG. 5, serve to interface logically with the Service Selection Gateway (SSG) are not an integral part of the present invention and therefore a discussion related to their functionality would not benefit the discussion of the present invention. The SSG 116 serves as a gateway between the user and the public area domains 106, such as the Internet. In order for a user host to gain access to a public domain network 106, such as the Internet, a user must first dial-in or otherwise make a connection with the SSG 116 through a data receiving interface (not shown in FIG. 5.). As a threshold matter, an authorizer (not shown in FIG. 5) within the SSG 116 serves to authenticate the identity of the user, insure authorization and ascertain the nature and scope of the public network services which it will provide.

The SSG 116 in turn is linked to a separate server/memory device 114, herein referred to as an Authentication, Authorization and Accounting (AAA) server. The SSG 116 and the AAA server 114 communicate with one-another according to the Remote Access Dial-In User Service (RADIUS) protocol. The specific details of the RADIUS protocol are well-known by those of ordinary skill in the art. Moreover, as will be apparent to those of ordinary skill in the art, the RADIUS protocol has limited applicability to the present invention and, therefore a detailed discussion of this protocol is deemed unnecessary. The preferred methods of the present invention described herein are not limited to the use of the RADIUS protocol and other equivalent authentication protocols may be used.

Once the SSG 116 completes an authentication process, a service profile request generator (not shown in FIG. 5) generates a service request packet and a forwarding interface (not shown in FIG. 5) sends a service the packet to the AAA server 114, the packet contains the requested service name information entered by the user, as well as additional information identifying the specific SSG 116 client. The AAA server 114 receives an access-request packet from the authorized SSG 116 client, it consults the data bank of service profiles contained in its memory and makes a match based on the user information provided in the request. In order to access the individual profile a match must be made between the password entered by the user and the password tied to the service profile. If the passwords match, and all other requirements are met the AAA server 114 sends the SSG 116 an "access-accept" packet in response. The access-accept packet contains all the pertinent information in the user specific service profile that enables the SSG 116 to provide the desired service to the user. The SSG 116 has links leading to downstream routers 118 which connect with the various public domains 106 and private domains 104.

The access-accept packet travels from the AAA server 114 to a second receiving interface (not shown in FIG. 5) within the SSG 116 where the SSG 116 serves to create secure channels to private areas of the network for those users who are authorized to use such sites and, an assessor within the SSG 116 makes a determination as to whether or not the service profile for the specified desired private domain site 104 requested by the user has a sequential only attribute associated with it. If a sequential only attribute does not exist in the profile a connection is opened through the home gate 120 of the requested private domain 104. In this instance, the user is free to continue the use of simultaneous then-existing open connections to other private or public domains. If a sequential only attribute does exist in the service profile for the specified desired private domain, then a determiner (not shown in FIG. 5) within the SSG 116 determines if the host computer 102 has any then-existing open connections with other public or private domain sites. If a determination is made that no other connections are currently open, then a connection is established through the home gate 120 of the requested private domain 104. If, however, the SSG 116 determines that the host computer 102 does have other then-existing connections open with other public or private domains, then a prompt generator (not shown in FIG. 5) generators and directs a prompt to the host computer 102 requiring the user to disconnect from all currently open connections before proceeding with the logon connection to the requested private domain site. The user must then disable all other connections before re-initiating the logon application process to access the desired private domain site.

The sequential-only attributed is requested by the domain owner to be placed in user service profiles. It allows the private domain owner the capability to insure that the user connects to their particular site while no other connections are concurrently open. This provides added security to the owner of the private domain by lessening the likelihood of an unauthorized invasion of the confidential information found within the network. The domain owner would have the control over which authorized users of their network have the attribute in their service profile and are, thus, limited to forced sequential access and which user profiles do not contain the sequential only attribute and are, thus, free to make multiple concurrent connections.

Alternative Embodiments

Although illustrative presently preferred embodiments and applications of this invention are shown and described herein, many variations and modifications are possible which remain within the concept, scope and spirit of the invention, and these variations would become clear to those skilled in the art after perusal of this application. The invention, therefore, is not limited except in spirit of the appended claims.

What is claimed is:

1. An apparatus for providing forced sequential network access to a user in a computer network capable of establishing multiple concurrent service connections, said apparatus comprising:

means for receiving user requested service information from a user in a computer network;

means for authorizing said user to access said requested service;

means for retrieving from a memory a user service profile associated with the user;

means for assessing said user service profile to determine if a "sequential-only" network access attribute exists within said user service profile for said requested service;

means for determining whether the user has a current network connection established with another service within the computer network; and means for allowing, in response to a user request, the user to connect to the desired service of the computer network specified in the user service request if the computer network service provider determines that the user has no then existing network connections to other services within the computer network.

2. The apparatus of claim 1 further comprising:

means for sending a prompt to the user if a determination is made that said "sequential only" network access attribute exists in said user service profile for said requested service and the computer network service provider determines that said user has a current network connection established with another service of the computer network, said prompt advising the user to disconnect from all then-existing network connections before proceeding with the requested service connection.

3. The apparatus of claim 2 further comprising:

means for causing the user to disconnect from all then existing network connections to other services of the computer network; and means for causing the user to initiate a service logon application upon the user disconnecting from all then existing network connections to other services of the computer network.

4. An apparatus for providing forced sequential network access to a user in a computer network capable of establishing multiple concurrent service connections, said apparatus comprising:

means for initiating a service logon application at the user level;

means for providing the service logon application with a requested service name and authorization information;

means for sending said requested service information to a computer network service provider;

means for authorizing said user to access said requested service;

means for causing the computer network service provider to retrieve from a memory a user service profile associated with the user and uniquely identified by user-provided identification information;

means for assessing said user service profile at the level of the computer network service provider to determine if a "sequential-only" network access attribute exists within said user service profile for said requested service;

means for determining at the level of the computer network service provider whether the user has a current network connection established with another service of the computer network; and means for allowing, in response to a user request, the user to connect to the desired service of the computer network specified in the user service request if the computer network service provider determines that the user has no then-existing network connections to other services of the computer network.

5. The apparatus of claim 4 further comprising:

means for sending a prompt to the user if the computer network service provider determines that said "sequential only" network access attribute exists in said user service profile for said requested service and the computer network service provider determines that said user has a current network connection established with another service of the computer network, said prompt advising the user to disconnect from all then-existing network connections before proceeding with the requested service connection.

6. The apparatus of claim 5 further comprising:

means for causing the user to disconnect from all then-existing network connections to other services of the computer network; and means for re-initiating said service logon application at said user level upon the user disconnecting from all then-existing network connections to other specific services of the computer network.

7. An apparatus for preventing unauthorized access to a specified service within a computer network via a user having both IP forwarding capability and authorization to use the specified service, said apparatus comprising:

means for receiving a user request to access the specified service from a user of the computer network;

means for authorizing said user to access the specified service;

means for retrieving from a memory a user service profile associated with the user;

means for assessing said user service profile to determine if a "sequential-only" network access attribute exists within said user service profile for the specified service;

means for determining whether the user has a current network connection established with another service of the computer network; and means for allowing, in response to a user request, the user to connect to the specified service of the computer network specified in the user request if the computer network service provider determines that the user has no then-existing network connections to another service of the computer network.

8. The apparatus of claim 7 further comprising:

means for sending a prompt to the user if a determination is made that said "sequential only" network access attribute exists in said user service profile for the specified service and the computer network service provider determines that said user has a current network connection established with another service of the computer network, said prompt advising the user to disconnect from all then-existing network connections before proceeding with the user request to access the specified connection.

9. The method of claim 8 further comprising:

means for causing the user to disconnect from all then-existing network connections to other services within the computer network; and means for causing the user to initiate a service logon application upon the user disconnecting from all then existing network connections to other services of the computer network.

10. A method for providing forced sequential network access to a user in a computer network capable of establishing a plurality of separate connections between the user and domain networks, said method comprising:

receiving a user request to access a specified service from a user of the computer network;

retrieving from a memory a user service profile associated with the user and uniquely identified by user-provided identification information;

assessing said user service profile to determine if a "sequential-only" network access attribute exists within said user service profile for the specified service;

determining whether the user has a current network connection established with another service of the computer network; and allowing the user, in response to a user request, to connect to the specified service of the computer network specified in the user request if the computer network service provider determines the user has no then-existing network connections to other services of the computer network.

11. The method of claim 10 further comprising:

sending a prompt to the user if a determination is made that said "sequential only" network access attribute exists in said user service profile for the specified service and the computer network service provider determines that said user has a current network connection established with another service of the computer network, said prompt advising the user to disconnect from all then-existing network connections before proceeding with the requested service connection.

12. The method of claim 11 further comprising:

causing the user to disconnect from all then-existing network connections to other services of the computer network; and causing the user to initiate a service logon application upon the user disconnecting from all then-existing network connections to other services of the computer network.

13. A method for forcing the users of a communication system to access services within the communication system via sequential-only access, said apparatus comprising:

accepting service requests from users;

granting service authorization to the users based upon user supplied authorization information;

generating service profile requests;

sending said service profile requests to a memory;

accepting requested service profiles from the memory;

assessing said requested service profiles for the presence of a "sequential-only" access attribute;

determining whether a user initiating a service access request has a then-existing connection open with another service of the communication system; and generating a prompt to be sent to a user initiating a service access request if a determination is made that a requested service is protected with a "sequential only" access attribute and said user has a then-existing connection open with another service the communication system.

14. A method for forcing the users of the system to gain access to specified domain networks via sequential-only access, said system comprising:

providing a plurality of host computers connected to network access points, said network access points including authentication servers and gateway devices;

storing a plurality of user service profiles, said user service profiles capable of having a "sequential only" network access attribute associated with user authorized services;

accepting service requests from users;

granting service authorization to the users based upon user-supplied authorization information;

generating service profile requests;

sending said service profile requests to a memory;

accepting requested service profiles from the memory;

assessing said requested service profiles for the presence of a "sequential-only" access attribute; and determining whether a user initiating a service access request has a then-existing connection open to another service of the communication system.

15. The method of claim 14 further comprising:

generating a prompt to be sent to a user initiating a service access request if a determination is made that a requested service is protected with a "sequential only" access attribute and said user has a then-existing connection open with another service of the communication system.

16. A program storage device readable by a machine, tangibly embodying a program of instructions executable by the machine for performing a method for providing forced sequential network access to a user in a computer network capable of establishing multiple concurrent service connections, said method comprising:

method for receiving user requested service information from a user in a computer network;

authorizing said user to access said requested service;

retrieving from a memory a user service profile associated with the user;

assessing said user service profile to determine if a "sequential-only" network access attribute exists within said user service profile for said requested service;

determining whether the user has a current network connection established with another service within the computer network; and allowing, in response to a user request, the user to connect to the desired service of the computer network specified in the user service request if the computer network service provider determines that the user has no then existing network connections to other services within the computer network.

17. The device of claim 16 wherein said method further comprises:

sending a prompt to the user if a determination is made that said "sequential only" network access attribute exists in said user service profile for said requested service and the computer network service provider determines that said user has a current network connection established with another service of the computer network, said prompt advising the user to disconnect from all then-existing network connections before proceeding with the requested service connection.

18. The device of claim 17 wherein said method further comprises:

causing the user to disconnect from all then existing network connections to other services of the computer network; and causing the user to initiate a service logon application upon the user disconnecting from all then existing network connections to other services of the computer network.

19. A program storage device readable by a machine, tangibly embodying a program of instructions executable by the machine for performing a method for providing forced sequential network access to a user in a computer network capable of establishing multiple concurrent service connections, said method comprising:

initiating a service logon application at the user level;

providing the service logon application with a requested service name and authorization information;

sending said requested service information to a computer network service provider;

authorizing said user to access said requested service;

causing the computer network service provider to retrieve from a memory a user service profile associated with the user and uniquely identified by user-provided identification information;

assessing said user service profile at the level of the computer network service provider to determine if a "sequential-only" network access attribute exists within said user service profile for said requested service;

determining at the level of the computer network service provider whether the user has a current network connection established with another service of the computer network; and allowing, in response to a user request, the user to connect to the desired service of the computer network specified in the user service request if the computer network service provider determines that the user has no then-existing network connections to other services of the computer network.

20. The device of claim 19 wherein said method further comprises:

sending a prompt to the user if the computer network service provider determines that said "sequential only" network access attribute exists in said user service profile for said requested service and the computer network service provider determines that said user has a current network connection established with another service of the computer network, said prompt advising the user to disconnect from all then-existing network connections before proceeding with the requested service connection.

21. The device of claim 20 wherein said method further comprises:

causing the user to disconnect from all then-existing network connections to other services of the computer network; and re-initiating said service logon application at said user level upon the user disconnecting from all then-existing network connections to other specific services of the computer network.

22. A program storage device readable by a machine, tangibly embodying a program of instructions executable by the machine for performing a method for preventing unauthorized access to a specified service within a computer network via a user having both IP forwarding capability and authorization to use the specified service, said method comprising:

receiving a user request to access the specified service from a user of the computer network;

authorizing said user to access the specified service;

retrieving from a memory a user service profile associated with the user;

assessing said user service profile to determine if a "sequential-only" network access attribute exists within said user service profile for the specified service;

determining whether the user has a current network connection established with another service of the computer network; and allowing, in response to a user request, the user to connect to the specified service of the computer network specified in the user request if the computer network service provider determines that the user has no then-existing network connections to another service of the computer network.

23. The device of claim 22 wherein said method further comprises:

sending a prompt to the user if a determination is made that said "sequential only" network access attribute exists in said user service profile for the specified service and the computer network service provider determines that said user has a current network connection established with another service of the computer network, said prompt advising the user to disconnect from all then-existing network connections before proceeding with the user request to access the specified connection.

24. The device of claim 23 wherein said method further comprises:

causing the user to disconnect from all then-existing network connections to other services within the computer network; and causing the user to initiate a service logon application upon the user disconnecting from all then existing network connections to other services of the computer network.

25. A program storage device readable by a machine, tangibly embodying a program of instructions executable by the machine for performing a method for providing forced sequential network access to a user in a computer network capable of establishing a plurality of separate connections between the user and domain networks, said method comprising:

receiving a user request to access a specified service from a user of the computer network;

retrieving from a memory a user service profile associated with the user and uniquely identified by user-provided identification information;

assessing said user service profile to determine if a "sequential-only" network access attribute exists within said user service profile for the specified service;

determining whether the user has a current network connection established with another service of the computer network; and allowing the user, in response to a user request, to connect to the specified service of the computer network specified in the user request if the computer network service provider determines that the user has no then-existing network connections to other services of the computer network.

26. The device of claim 25 wherein said method further comprises:

sending a prompt to the user if a determination is made that said "sequential only" network access attribute exists in said user service profile for the specified service and the computer network service provider determines that said user has a current network connection established with another service of the computer network, said prompt advising the user to disconnect from all then-existing network connections before proceeding with the requested service connection.

27. The device of claim 26 wherein said method further comprises:

causing the user to disconnect from all then-existing network connections to other services of the computer network; and causing the user to initiate a service logon application upon the user disconnecting from all then-existing network connections to other services of the computer network.

28. A program storage device readable by a machine, tangibly embodying a program of instructions executable by the machine for performing a method for forcing the users of a communication system to access services within the communication system via sequential-only access, said method comprising:

accepting service requests from users;

granting service authorization to the users based upon user supplied authorization information;

generating service profile requests;

sending said service profile requests to a memory;

accepting requested service profiles from the memory;

assessing said requested service profiles for the presence of a "sequential-only" access attribute;

determining whether a user initiating a service access request has a then-existing connection open with another service of the communication system; and generating a prompt to be sent to a user initiating a service access request if a determination is made that a requested service is protected with a "sequential only" access attribute and said user has a then-existing connection open with another service the communication system.

29. A program storage device readable by a machine, tangibly embodying a program of instructions executable by the machine for performing a method of operating a communicating system capable of forcing the users of the system to gain access to specified domain networks via sequential-only access, said system including providing a plurality of host computers connected to network access points, said network access points including authentication servers and gateway devices, said method comprising:

storing a plurality of user service profiles, said user service profiles capable of having a "sequential only" network access attribute associated with user authorized services;

accepting service requests from users;

granting service authorization to the users based upon user-supplied authorization information;

generating service profile requests;

sending said service profile requests to a memory;

accepting requested service profiles from the memory;

assessing said requested service profiles for the presence of a "sequential-only" access attribute; and determining whether a user initiating a service access request has a then-existing connection open to another service of the communication system.

30. The device of claim 29 wherein said method further comprises:

generating a prompt to be sent to a user initiating a service access request if a determination is made that a requested service is protected with a "sequential only" access attribute and said user has a then-existing connection open with another service of the communication system.

* * * * *

UNITED STATES PATENT AND TRADEMARK OFFICE
CERTIFICATE OF CORRECTION

PATENT NO. : 6,301,618 B1
DATED : October 9, 2001
INVENTOR(S) : Aravind Sitaraman, Shuxian Lou and Shujin Zhang It is certified that error appears in the above-identified patent and that said Letters Patent is hereby corrected as shown below:

<u>Column 2,</u>
Line 11, replace "1 4" with -- 14 --.

<u>Column 3,</u>
Line 31, replace "unauthorized" with -- *unauthorized* --.

<u>Column 8,</u>
Line 59, delete the first "the".

Signed and Sealed this

Ninth Day of July, 2002

*Attest:*

JAMES E. ROGAN
*Attesting Officer*            *Director of the United States Patent and Trademark Office*